(12) United States Patent
Zhou

(10) Patent No.: US 11,615,036 B2
(45) Date of Patent: Mar. 28, 2023

(54) METHOD FOR IDENTIFYING ADDRESS OF SLAVE DEVICES, SYSTEM, AND DEVICE APPLYING THE METHOD

(71) Applicant: Fulian Precision Electronics (Tianjin) Co., LTD., Tianjin (CN)

(72) Inventor: Xiao-Long Zhou, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 30 days.

(21) Appl. No.: 17/510,859

(22) Filed: Oct. 26, 2021

(65) Prior Publication Data

US 2023/0056586 A1 Feb. 23, 2023

(30) Foreign Application Priority Data

Aug. 23, 2021 (CN) .......................... 202110968233.0

(51) Int. Cl.
*G06F 13/14* (2006.01)
*G06F 1/26* (2006.01)

(52) U.S. Cl.
CPC ................ *G06F 13/14* (2013.01); *G06F 1/26* (2013.01)

(58) Field of Classification Search
CPC ........ G06F 13/14; G06F 13/16; G06F 13/161; G06F 13/382; G06F 13/385; G06F 13/387; G06F 13/4063; G06F 13/4068; G06F 13/4081; G06F 13/409; G06F 2213/0024; G06F 9/4413

See application file for complete search history.

(56) References Cited

U.S. PATENT DOCUMENTS

| 11,106,620 | B1 * | 8/2021 | Mishra ...................... G06F 1/10 |
| 2012/0007624 | A1 * | 1/2012 | Byeon ................. G11C 11/4076 |
| | | | 324/750.15 |
| 2012/0243559 | A1 * | 9/2012 | Pan ........................ H04J 3/1605 |
| | | | 370/503 |
| 2018/0335806 | A1 * | 11/2018 | Min ....................... G06F 1/3287 |
| 2018/0357194 | A1 * | 12/2018 | Ulmer ................. G06F 13/3625 |

FOREIGN PATENT DOCUMENTS

CN 102708072 A 10/2012

* cited by examiner

*Primary Examiner* — Raymond N Phan
(74) *Attorney, Agent, or Firm* — ScienBiziP, P.C.

(57) ABSTRACT

In a method and system for identifying addresses of slave devices, the system includes a main board, slave devices, and a power source. The main board is electrically connected to the slave devices and a delay unit is set in each slave device. An output terminal of the delay unit is electrically connected to the main board. The delay unit outputs a delay signal to the main board when first powered on, the main board receives the delay signal, computes a delay time of the delay signal, and by reference to a preset table identifies the slave device based on the specific delay time. Occupation of input and output I/O pins is reduced, a device for identifying addresses of slave devices is also disclosed.

15 Claims, 4 Drawing Sheets

METHOD FOR IDENTIFYING ADDRESS OF SLAVE DEVICES, SYSTEM, AND DEVICE APPLYING THE METHOD

FIELD

The subject matter herein generally relates to data transmission, particularly to slave device identification, a method for identifying slave device, a system, and a device applying the method.

BACKGROUND

In an electronic device system, a master chip communicates with several slave devices. The master chip detects IDs for distinguishing between slave devices according to their addresses.

There are two conventional procedures. In one, identification (ID) signals outputted by different slave devices are at different voltage level values. The master chip collects the voltage level values from different slave devices by an analog-to-digital converter. In the alternative procedure, each digital signal outputted by each slave device forms a matrix, and the master chip identifies different matrixes for distinguishing between different slave devices.

When the master chip is a programmable logic chip, such as a complex programmable logic device (CPLD) or a field-programmable gate array (FPGA), neither the CPLD nor the FPGA has an analog-to-digital converter pin. Thus, CPLD/FPGA fails to distinguish between different slave devices based on the different voltage level values. By using the second procedure, the more slave devices which exist, the greater the number of pins of the CPLD/FPGA which are occupied. A larger matrix needs to be formed by the signals outputted by each slave device for distinguishing between the slave devices. Each slave device needs to be connected with I/O pins of the CPLD/FPGA, but an input/output (I/O) pin resource of the CPLD/FPGA is lacking.

Thus, there is room for improvement in the art.

BRIEF DESCRIPTION OF THE DRAWINGS

Implementations of the present disclosure will now be described, by way of example only, with reference to the attached figures.

DETAILED DESCRIPTION

Figure 1:
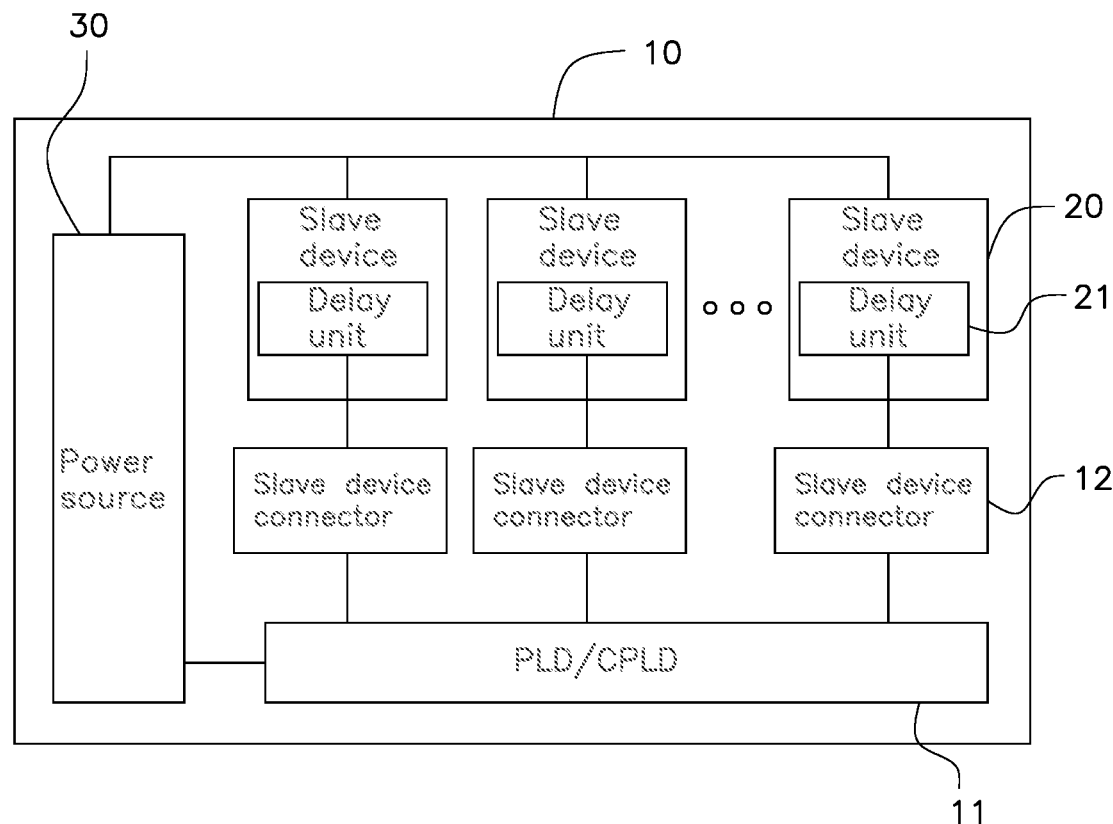
FIG. 1 is a diagram illustrating an embodiment of a system for identifying slave devices according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

The present disclosure provides a system for identifying addresses of slave devices in a master and slave communication system. The system includes a main board and slave devices. The main board is electrically connected to the slave devices.

Each slave device includes a delay unit. An output terminal of the delay unit is electrically connected to the main board. The delay unit is configured to output a delay signal to the main board.

The main board is configured to receive the delay signal and compute a delay time of the delay signal, the slave device is identified based on the delay time.

The present disclosure also provides a method for identifying the address of slave device, used in a system for identifying addresses of slave devices. The system includes a main board and slave devices. The main board is electrically connected to the slave devices. Each slave device includes a delay unit. An output terminal of the delay unit is electrically connected to the main board. The method includes:

The delay unit outputs a delay signal to the main board;

The main board receives the delay signal and computes a delay time of the delay signal, and further identifies the slave device based on the delay time.

The main board of the present disclosure identifies the slave device based on the delay time of the delay signal, thus fewer input/output (I/O) pins are occupied.

FIG. 1 shows a system 100 for identifying addresses of slave devices 20. The system 100 includes a main board 10 and slave devices 20. The main board 10 is electrically connected to the slave devices 20. Each slave device 20 includes a delay unit 21. The delay unit 21 is electrically connected to the main board 10, and the delay unit 21 is configured to output a delay signal to the main board 10. The main board 10 is configured to receive the delay signal and compute a delay time of the delay signal and is configured to identify the slave device 20 based on the delay time.

When the system 100 is powered on, a power source 30 powers the main board 10 and the slave devices 20. The main board 10 starts counting time, and the delay unit 21 in each slave device 20 outputs a high-level signal to the main board 10. After a specified time duration, the delay unit 21 in each slave device 20 outputs a low-level signal to the main board 10, which causes the main board 10 to stop timing. The delay signal from the slave device 20 outputs the low-level signal after a certain time period, a period from the signal being high level until the signal becomes low level serving as the delay time. The main board 10 pre-stores predetermined delay times corresponding to different address information of different slave devices 20. The main board 10 matches the address information based on the delay time and identifies the slave device 20 based on the address information.

As shown in FIG. 1, the main board 10 includes a programmable component 11 being electrically connected to a slave device connector 12. The programmable component 11 can be a programmable logic device (PLD) or a complex programmable logic device (CPLD). The PLD or the CPLD is electrically connected to the slave device 20 by the slave device connector 12. The delay unit 21 is set in the slave device 20. The slave device 20 outputs the delay signal to the PLD or the CPLD through the delay unit 21 and the slave device connector 12. The PLD or the CPLD receives the delay signal and computes the delay time of the delay signal. Each slave device 20 corresponds to one particular delay time. The delay times are different from each other. Thus, the PLD or the CPLD identifies the slave device 20 based on the delay time.

Figure 2:
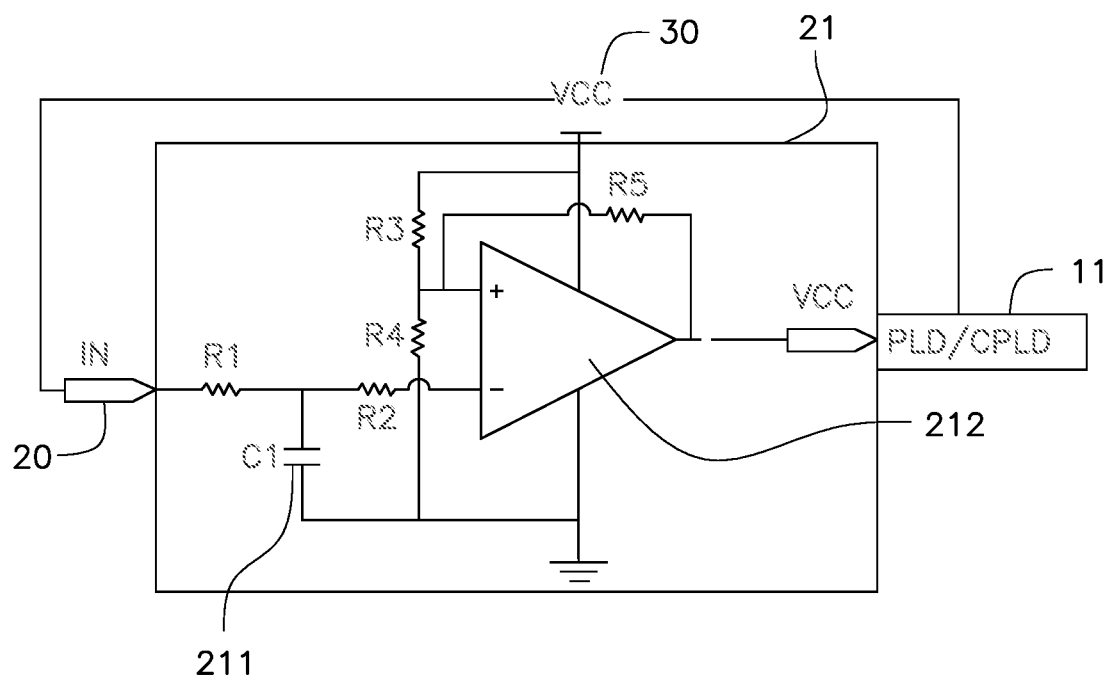
FIG. 2 is a diagram illustrating an embodiment of a delay circuit in the system according to the present disclosure.

As shown in FIG. 2, in some embodiments, a delay capacitor 211 is set in the delay unit 21. The delay unit 21 is an electrical structure with the delay capacitor 211 and resistors. The delay unit 21 of the slave device 20 can include the delay capacitor 211, a first resistor R1, a second resistor R2, a third resistor R3, a fourth resistor R4, a fifth resistor R5, and a voltage comparator 212. A terminal of the first resistor R1 is electrically connected to an input terminal of the slave device 20, and another terminal of the first resistor R1 is electrically connected to a terminal of the second resistor R2 and a terminal of the delay capacitor 211. Another terminal of the delay capacitor 211 is grounded. Another terminal of the second resistor R2 is electrically connected to a negative terminal of the voltage comparator 212. A terminal of the third resistor R3 is electrically connected to the power source 30, and another terminal of the third resistor R3 is electrically connected to a positive terminal of the voltage comparator 212 and a terminal of the fourth resistor R4. Another terminal of the fourth resistor R4 is grounded. A terminal of the fifth resistor R5 is electrically connected to the another terminal of the third resistor R3, and another terminal of the fifth resistor R5 is electrically connected to an output terminal of the voltage comparator 212. The fifth resistor R5 is a positive feedback resistor which removes output jitter of the voltage comparator 212.

At the time of the system 100 being powered on, the power source 30 powers the PLD or the CPLD. The PLD or the CPLD starts to count time, and the power source 30 charges the delay capacitor 211 in the delay unit 21. A terminal voltage V− of the capacitor 211 is zero at the time of being powered on, a terminal voltage V+ between the third resistor R3 and the fourth resistor R4 is larger than the terminal voltage V−. The voltage comparator 212 outputs the high-level signal, the counting of time by the PLD or the CPLD continues for as long as the high-level signal is outputted by the voltage comparator 212. While the delay capacitor 211 charges, the terminal voltage V− of the delay capacitor 211 gradually increases. When the terminal voltage V− of the delay capacitor 211 is larger than the terminal voltage V+, the voltage comparator 212 output the low-level signal, the PLD or the CPLD stops timing, and the PLD or the CPLD computes the delay time of the output of the voltage comparator 212, from being high to going low. The PLD or the CPLD has a preset mapped table of addresses of the slave devices 20 corresponding to the delay time. The PLD or the CPLD matches the address information of the slave device 20 based on the delay time and identifies the slave device 20 based on the address information.

In some embodiments, the slave devices 20 at least include a first slave device and a second slave device. The delay unit at least includes a first delay unit and a second delay unit.

The first delay unit is set in the corresponding first slave device. The second delay unit is set in the corresponding second slave device. The first delay unit and the second delay unit are respectively and electrically connected to the main board 10.

The delay capacitor 211 in the first delay unit is different from the delay capacitor 211 in the second delay unit. A capacitance of the delay capacitor 211 in the first delay unit is different from a capacitance of the delay capacitor 211 in the second delay unit, thus speed of charging of the delay capacitors 211 are different, and thus the times from high to low are also different. The delay time of the first delay unit is different from the delay time of the second delay unit.

In some embodiments, the first delay unit 21 is configured to output a first delay signal to the main board 10, and the second delay unit 21 is configured to output a second delay signal to the main board 10. The main board 10 is configured to receive the first delay signal and compute a first delay time of the first delay signal, and configured to receive the second delay signal and compute a second delay time of the second delay signal. The main board 10 is configured to obtain a first address information in a mapped table of relationships based on the first delay time and is configured to obtain a second address information in the mapped table. The main board 10 identifies the first slave device based on the first address information and identifies the second slave device based on the second address information.

Thus a delay unit 21 is set in each slave device 20, and the low-level signal outputted from the slave device 20 is delayed for the time period, and after the time period the main board 10 receives the low-level signal. The main board 10 confirms an address information based on a length of the time period. By adjusting the capacitance of the delay capacitor 211, the length of delay is steadily controlled. Thus, errors in identifying addresses are avoided and reliability of the main board 10 for identifying the address of the slave device 20 is improved. Communication between the main board 10 and any particular slave device 20 is assured.

As shown in FIG. 1, the system 100 also includes a storage unit (not shown), the system 100 includes n number of slave devices 20. Each slave device 20 includes the delay unit 21. The delay capacitors in different delay units 21 of the n number of the slave devices 20 are different from each other. The delay times corresponding to the delay capacitors are different from each other, thus the n number of the slave devices 20 each correspond to a different delay time. The PLD or the CPLD matches the delay times with the address information to form the mapped table between the delay time and the slave device 20, which is stored in the storage unit (not shown). When the PLD or the CPLD computes a delay time, the delay time is compared with the data in the mapped table for identifying the address information of the slave device 20 corresponding to the delay time.

Figure 3:
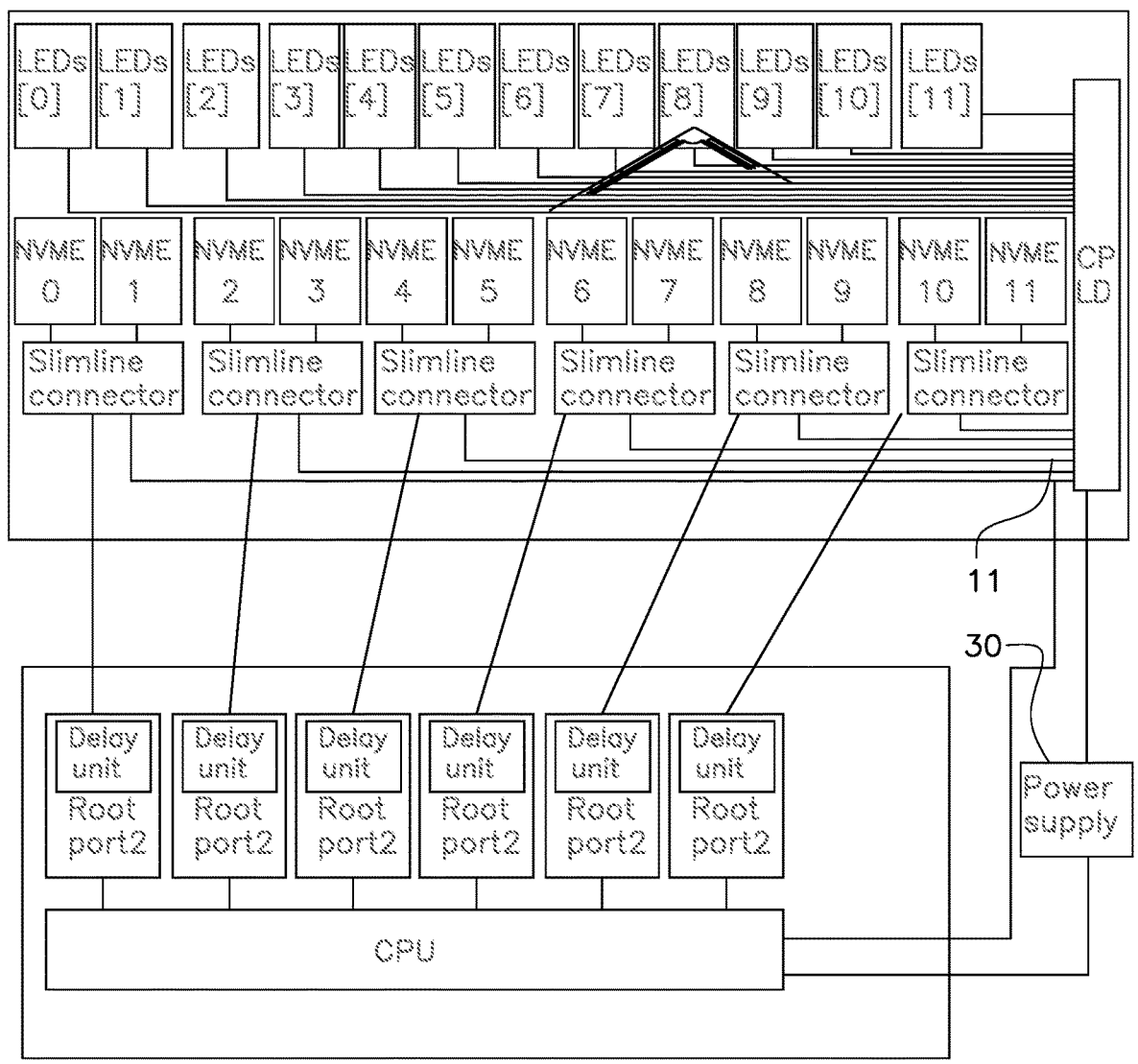
FIG. 3 is a diagram illustrating an embodiment of a table and CPU root port addresses device according to the present disclosure.

As shown in FIG. 3, there are 12 hard disks, NVME0-NVME11, and 12 LED indicators, LED[0]-LED[11], on 12 hard disk backplanes. The 12 hard disks and the 12 LED indicators are electrically connected to the CPLD. Each hard disk NWME corresponds to one LED indicator. For example, the hard disk NVME0 corresponds to the LED indicator LED[0], the LED indicator LED[0] indicates a state of the corresponding disk NVME0. The hard disk NVME0-NVME11 are divided into six groups. Each group of the hard disk is electrically connected to a root port of a central processing unit (CPU) by a slimline or other connector. The six root ports are respectively connected to the six groups of hard disk through the sixth slimline connectors. A delay unit is set in each root port, thus each slimline connector can output a different delay signal.

When the system is powered on, the six root ports output different delay signals to corresponding six groups of the hard disk. The CPLD computes the delay time corresponding to the delay signal based on the above method, and address information corresponding to the root port is identified based on corresponding delay time. The hard disk corresponding to the root port is identified based on the corresponding address information. The CPLD lights up the LED indicator corresponding to the identified hard disk.

By setting the delay circuit in the root port, even if a slimline connector is connected to a wrong group of hard disks, the CPLD can identify the correct hard disk corresponding to the root port based on the delay signal outputted by the root port.

Figure 4:
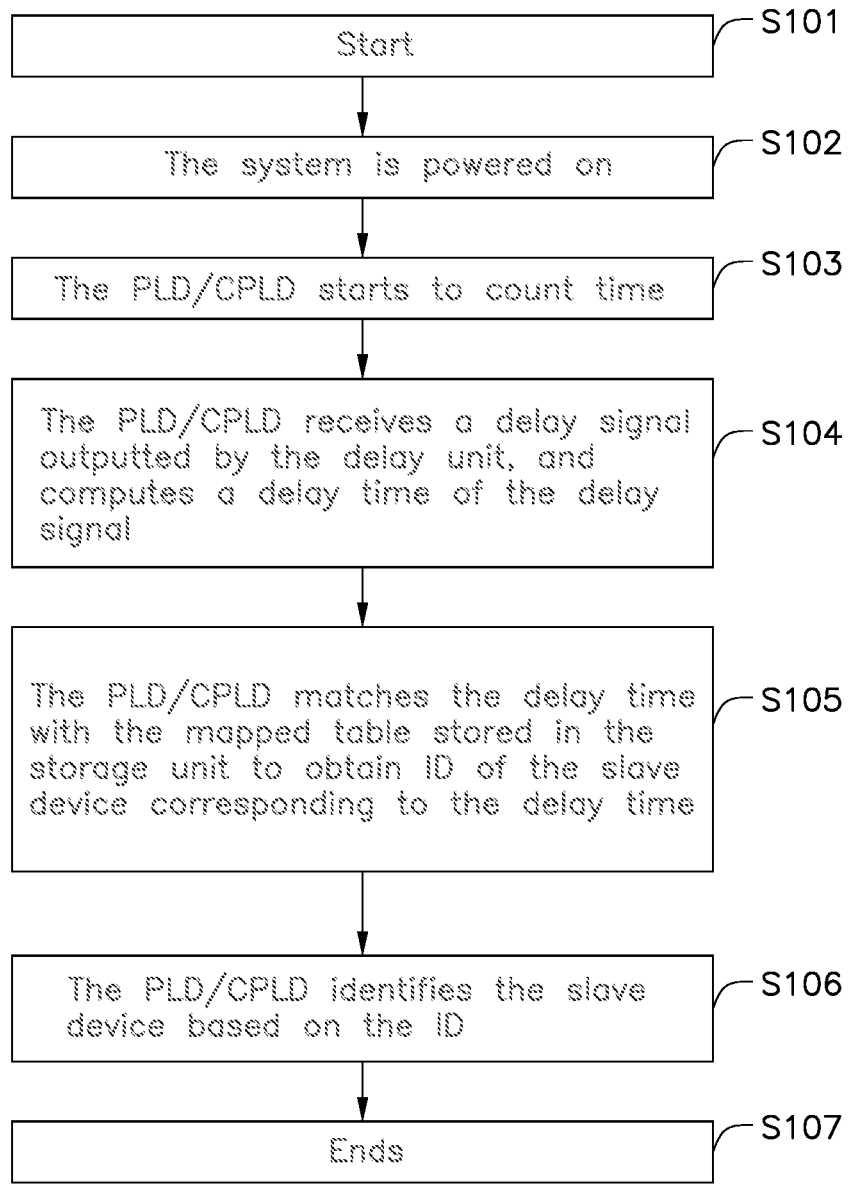
FIG. 4 is a flowchart illustrating an embodiment of method for identifying addresses of slave devices according to the present disclosure.

As shown in FIG. 4, a method for identifying addresses of slave devices is also disclosed, the method is used in a system 100 for identifying addresses of slave devices. The system 100 includes a main board 10, slave devices 20, and a power source 30. The power source 30 is electrically connected to the main board 10 and the slave devices 20. The main board 10 is electrically connected to the slave devices 20. A delay unit 21 is set in each slave device 20. An output terminal of the delay unit 21 is electrically connected to the main board 10. The method includes the following steps, these steps may be re-ordered:

In block S101, the procedure starts;
In block S102, the system 100 is powered on;
In block S103, the PLD/CPLD starts to count time;
In block S104, the PLD/CPLD receives a delay signal outputted by the delay unit and computes a delay time of the delay signal;
In block S105, the PLD/CPLD matches the delay time with the mapped table stored in the storage unit to obtain the identification (ID) of the slave device corresponding to the delay time.
In block S106, the PLD/CPLD identifies the slave device based on the ID;
In block S107, the procedure ends.

In some embodiments, a delay capacitor is set in each delay unit. By adjusting a capacitance of the delay capacitor, the delay time is adjusted.

In some embodiments, the slave devices 20 at least includes a first slave device and a second slave device.

A first delay unit is set in the first slave device, and a second delay unit is set in the second slave device. The first delay unit and the second delay unit are respectively and electrically connected to the main board 10.

The delay capacitor in the first delay unit is different from the delay capacitor in the second delay unit.

In some embodiment, there is a storage unit (not shown). The main board 10 is electrically connected to the storage unit. The storage unit stores the mapped table between the delay time and the address information of the slave device.

The step of the main board 10 receives a delay signal and computes a delay time of the delay signal further includes the following steps:

The main board 10 obtains address information corresponding to the salve device 20 from the mapped table based on the delay time.

The main board 10 identifies the slave device 20 based on the address information.

In some embodiments, the slave devices 20 at least includes a first slave device and a second slave device. A first delay unit is set in the first slave device sets, and a second delay unit is set in the second slave device. The first delay unit and the second delay unit are respectively and electrically connected to the main board 10. The first delay unit is configured to output a first delay signal to the main board 10, and the second delay unit is configured to output a second delay signal to the main board 10. The method further includes the following steps:

The main board 10 receives the first delay signal and computes a first delay time of the first delay signal. The main board 10 further receives the second delay signal and computer a second delay time of the second delay signal. The main board 10 obtains a first address information from the mapped table based on the first delay time, and obtains a second address information from the mapped table based on the second delay time. The main board 10 identifies the first slave device based on the first address information, and identifies the second slave device based on the second address information.

Each delay unit is set in one slave device of the present disclosure. Different capacitors are set in the delay units. The delay times outputted by the delay units are different, and each delay time corresponds to address information of the slave device 20. Thus, the main board 10 can obtain the corresponding address information of the slave device based on the delay time, and identify the corresponding slave device 20 based on the address information. An occupation of input and output I/O pins is reduced, and an identification accuracy of the slave device 20 is improved.

The present disclosure also provides a device for identifying addresses of slave devices. The device includes:

A processor, a storage, and specified programs for identifying the addresses of the slave devices stored in the storage, which can be implemented by the processor, the specified programs for identifying the addresses of the slave devices is configured to execute the steps of the above method for identifying the addresses of the slave devices.

The processor can be a central processing unit (CPU), and can be other general processor, a digital signal processor (DSP), an application specific integrated circuit (ASIC), the FPGA, or other programmable logic device, a separate gate or transistor logic device, a separate hardware component, and so on. The general processor can be a microprocessor, other regular data processing chips, and so on. The process is a control center, and connects with other parts using various interfaces and lines.

The storage can be configured to store computer programs, and/or modules/units. The processor may run or execute the computer programs and/or modules/units stored in the storage, and may call data stored in the storage to implement various functions. The storage can include an external storage, and also can include an internal storage. In addition, the storage may include a high-speed random access memory, and may also include a non-transitory storage medium, such as a hard disk, an internal memory, a plug-in hard disk, a smart media card (SMC), and a secure digital (SD) card, a flash card, at least one disk storage device, a flash memory device, or other non-transitory solid-state storage device.

When the modules/units integrated are implemented in the form of software functional units and sold or used as independent products, they can be stored in a computer readable storage medium. Based on this understanding, all or part of the processes in the methods of the above embodiments implemented by the present disclosure can also be completed by related hardware instructed by computer readable program instructions. The computer readable program instructions can be stored in the computer readable storage medium. The computer-readable instructions, when executed by the processor, may implement the steps of the foregoing method embodiments. It should be noted that the content contained in the computer readable storage medium may be appropriately increased or decreased according to the requirements of legislation and patent practice in a jurisdiction, for example, in some jurisdictions, according to legislation and patent practice, computer readable media does not include electrical carrier signals and telecommunication signals.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable non-transitory storage medium within the respective computing/processing device.

Computer readable program instructions for carrying out the steps of the method herein may be assembler instructions, instruction-set-architecture (ISA) instructions, machine instructions, machine dependent instructions, microcode, firmware instructions, state-setting data, or source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on one computer, partly on the computer, as a stand-alone software package, partly on the first computer and partly on a remote computer or entirely on the remote computer or server. In the latter scenario, the remote computer may be connected to the first computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, FPGA, or programmable logic arrays (PLA) may execute the computer readable program instructions by utilizing state information of the computer readable program instructions to personalize the electronic circuitry to perform embodiments of the present disclosure.

Embodiments of the present disclosure are described herein with reference to flowchart illustrations and/or block diagrams of apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur other than in the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for identifying addresses of slave devices, the system comprises:
    a main board;
    a plurality of slave devices; and
    a power source; wherein
    the power source is electrically connected to the main board and the slave devices, the main board is electrically connected to the slave devices,
    the power source powers the main board and the slave devices,
    a delay unit is set in each of the plurality of slave devices,
    an output terminal of the delay unit is electrically connected to the main board and outputs a delay signal to the main board, and
    the main board receives the delay signal, computes a delay time of the delay signal, and identifies the slave device based on the delay time.

2. The system of claim 1, wherein a delay capacitor is set in each delay unit; the delay capacitor is configured to adjust the delay time.

3. The system of claim 2, wherein the plurality of slave devices comprises a first slave device and a second slave device; the delay unit at least comprises a first delay unit and a second delay unit; the first delay unit is set in the first slave device, and the second delay unit is set in the second slave device;
the first delay unit and the second delay unit are electrically connected to the main board respectively; and
delay capacitor in the first delay unit is different from delay capacitor in the second delay unit.

4. The system of claim 3, wherein the system pre-stores a mapped table between the delay times and address information of the slave devices; and
the main board obtains the address information of the slave device based on the delay time and identifies the slave device based on the address information.

5. The system of claim 4, wherein the first delay unit is configured to output a first delay signal to the main board, and the second delay unit is configured to output a second delay signal to the main board;
the main board receives the first delay signal and computes a first delay time of the first delay signal;
the main board receives the second delay signal and computes a second delay time of the second delay signal;
the main board obtains a first address information from the mapped table based on the first delay time and obtains a second address information from the mapped table; and
the main board identifies the first slave device based on the first address information and identifies the second slave device based on the second address information.

6. A method for identifying addresses of slave devices, used in a system for identifying addresses of slave devices, the system comprises a main board, a plurality of slave devices, and a power source, the power source is electrically connected to the main board and the slave devices, the main board is electrically connected to the slave devices, a delay unit is set in each of the plurality of slave devices; an output terminal of the delay unit is electrically connected to the main board; the method comprises:
powering on the system;
starting to count time and receiving a delay signal outputted by the delay unit by the mainboard; and
computing a delay time of the delay signal by the main board and identifying the slave device based on the delay time.

7. The method of claim 6, wherein a delay capacitor is set in each delay unit; the method further comprises:
the delay time is adjusted by changing a capacitance of the delay capacitor.

8. The method of claim 7, wherein the system pre-stores a mapped table between the delay times and address information of the slave devices, the method further comprising:
receiving, by the main board, the delay signal and computing the delay time of the delay signal;
obtaining, by the main board, the address information of the slave device based on the delay time; and
identifying by the main board the slave device based on the address information.

9. The method of claim 8, wherein the plurality of slave devices at least comprises a first slave device and a second slave device;
a first delay unit is set in the first slave device and a second delay unit is set in the second slave device;
the first delay unit and the second delay unit are electrically connected to the main board respectively; and
delay capacitor in the first delay unit is different from delay capacitor in the second delay unit.

10. The method of claim 9, wherein the first delay unit is configured to output a first delay signal to the main board, the second delay unit is configured to output a second delay signal to the main board, the method further comprising:
receiving, by the main board, the first delay signal and computing a first delay time of the first delay signal;
receiving, by the main board, the second delay signal and computing a second delay time of the second delay signal;
obtaining, by the main board a first address information from the mapped table based on the first delay time and obtaining a second address information from the mapped table; and
identifying, by the main board the first slave device based on the first address information and identifying the second slave device based on the second address information.

11. A device for identifying addresses of slave devices, the device comprises a main board, a plurality of slave devices, and a power source, the power source is electrically connected to the main board and the slave devices, the main board is electrically connected to the slave devices, a delay unit is set in each of the plurality of slave devices; an output terminal of the delay unit is electrically connected to the main board; the device comprises:
a storage; and
a processor, wherein
the storage stores computer programs, and
the processor executes the computer programs to implement the following steps:
powering on the system;
starting to count time, by the main board, and receiving a delay signal outputted by the delay unit; and
computing, by the main board, a delay time of the delay signal and identifying the slave device based on the delay time.

12. The device of claim 11, wherein a delay capacitor is set in each delay unit; the delay time is adjusted by changing a capacitance of the delay capacitor.

13. The device of claim 12, wherein the system pre-stores a mapped table between the delay times and address information of the slave devices; the steps of the processor executing the computer programs further comprising:
receiving, by the main board, the delay signal and computing the delay time of the delay signal;
obtaining, by the main board, the address information of the slave device based on the delay time; and
identifying, by the main board, the slave device based on the address information.

14. The device of claim 13, wherein the plurality of slave devices at least comprises a first slave device and a second slave device;
a first delay unit is set in the first slave device, and a second delay unit is set in the second slave device;
the first delay unit and the second delay unit are electrically connected to the main board respectively;
delay capacitor in the first delay unit is different from delay capacitor in the second delay unit.

15. The device of claim 14, wherein the first delay unit is configured to output a first delay signal to the main board; the second delay unit is configured to output a second delay signal to the main board; the steps of the processor executing the computer programs further comprising:
receiving, by the main board, the first delay signal, and computing a first delay time of the first delay signal;

receiving, by the main board, the second delay signal, and computing a second delay time of the second delay signal;
obtaining, by the main board, a first address information from the mapped table based on the first delay time, and obtaining a second address information from the mapped table; and
identifying, by the main board, the first slave device based on the first address information and identifying the second slave device based on the second address information.

* * * * *